(12) United States Patent
Avila et al.

(10) Patent No.: US 6,947,584 B1
(45) Date of Patent: Sep. 20, 2005

(54) VOLUME IMAGING SYSTEM

(75) Inventors: Ricardo Scott Avila, Clifton Park, NY (US); James Vradenburg Miller, Clifton Park, NY (US); Robert Franklin Senzig, Germantown, WI (US); Hui David He, Shanghai (CN); Darin Robert Okerlund, Muskego, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/418,142

(22) Filed: Oct. 14, 1999

Related U.S. Application Data

(63) Continuation-in-part of application No. 09/139,438, filed on Aug. 25, 1998, now Pat. No. 6,141,398.

(60) Provisional application No. 60/109,987, filed on Nov. 25, 1998.

(51) Int. Cl.[7] ............................................... G06K 9/00

(52) U.S. Cl. ....................... 382/131; 382/154; 128/916; 128/922; 378/41

(58) Field of Search ............................... 382/131, 154; 128/916; 42/4, 21–27

(56) References Cited

U.S. PATENT DOCUMENTS

| 5,274,551 A | * | 12/1993 | Corby, Jr. ................... 600/433 |
| 5,315,512 A | * | 5/1994 | Roth .......................... 600/442 |
| 5,396,890 A | * | 3/1995 | Weng ......................... 600/443 |
| 5,430,784 A | * | 7/1995 | Ribner et al. ................ 378/19 |
| 5,601,083 A | * | 2/1997 | Anderson ................... 600/443 |
| 5,782,762 A | * | 7/1998 | Vining ........................ 600/407 |
| 5,787,889 A | * | 8/1998 | Edwards et al. ............ 600/443 |
| 5,842,473 A |  | 12/1998 | Fenster et al. |
| 6,256,529 B1 | * | 7/2001 | Holupka et al. ............ 600/427 |

\* cited by examiner

*Primary Examiner*—Amelia M. Au
*Assistant Examiner*—Anand Bhatnagar
(74) *Attorney, Agent, or Firm*—Carl B. Horton, Esq.; Armstrong Teasdale LLP

(57) ABSTRACT

A volume imaging system which progressively constructs, analyzes, and updates three dimensional models while acquiring cross-sectional data is described. The system constructs and displays three-dimensional renderings, and performs quantitative calculations in real time during the imaging system data collection process, displays interactive three-dimensional renderings in a traditional post-data collection process, as well as prescribes, archives, films, and transmits rendering procedures, parameters, renderings, measurements, and processed data, during data collection and post-acquisition.

35 Claims, 6 Drawing Sheets

VOLUME IMAGING SYSTEM

CROSS REFERENCE TO RELATED APPLICATION

This application claims the benefit of U.S. Provisional Application No. 60/109,987, filed Nov. 25, 1998 and is a continuation-in-part (CIP) of application Ser. No. 09/139,438, filed Aug. 25, 1998 and issuing as U.S. Pat. No. 6,141,398 assigned to the present assignee.

BACKGROUND OF THE INVENTION

This invention relates generally to medical imaging and more particularly, to methods and systems for generating three dimensional volumetric data sets.

Known medical imaging systems, such as computed tomography, magnetic resonance, and ultrasound imaging systems, generate 2-dimensional (2D) images for real time visualization of cross-sectional data. More particularly, and with such known systems, 2D images are immediately displayed following acquisition and reconstruction of the cross-sectional data. The real time display of 2D images facilitates ensuring that the scan is proceeding with appropriate parameters, e.g., slice thickness, to meet the imaging requirements.

Even though most known imaging systems generate 2D images, most known imaging systems acquire a three-dimensional (3D) volume of information. With such known systems, 3D images and measurements typically are not generated during a scan due to the processing requirements associated with generating such 3D images and measurements. Particularly, images and measurements preferably are generated, in real time, for display to an operator so that the operator can make any necessary adjustments. Since 3D images require more processing time to generate than 2D images, most known systems generate 2D images for real time display. The 3D images, however, convey more information to the operator.

It would be desirable to provide an imaging system which enables an operator to measure and visualize a three dimensional volumetric data set as the data is being acquired. It also would be desirable to provide an imaging system that prepares 3D models for post-processing and provides the operator with 3D images and measurements.

BRIEF SUMMARY OF THE INVENTION

These and other objects and advantages may be provided by a volume imaging system which progressively constructs, analyzes, and updates three dimensional models while cross-sectional data (not limited to but including axial cross-sectional data) is being acquired. The system constructs and displays three-dimensional renderings, and performs quantitative calculations in real time during the imaging system data collection process, displays interactive three-dimensional renderings in a traditional post-data collection process, as well as prescribes, archives, films, and transmits rendering procedures, parameters, renderings, measurements, and processed data, during data collection and post-acquisition.

In one specific embodiment, the system includes an operator console having an exam prescription subsystem which specifies the manner in which the imaging system acquires data, a visualization subsystem responsible for the presentation layout and display of the acquired images and processed data, an archive subsystem for permanent storage and future retrieval of imaging data, a filming subsystem which transfers data onto film, and a networking subsystem that transfers data via a network to or from other imaging systems. The exam prescription subsystem is responsible for determining how the patient exam data is acquired. Numerous parameters are required to specify an acquisition including a sequence of slice locations, slice thickness, field-of-view, scanning technique, and reconstruction algorithm. In addition, volume imaging and filming presentation parameters may also be included in the exam scan prescription. Until now, the scan prescriptions did not include volume imaging and filming parameters. These parameters can be entered explicitly by the technologist or, more commonly, the parameters are defined by selecting a particular scan protocol as is well known in the art. The exam prescription subsystem generates a scan prescription and the prescription is transmitted to the data acquisition system (DAS). The scan protocol can also include contrast injection parameters by including contrast injection tracking as part of the protocol. This could be extended to include control of a contrast injector to execute the stored contrast instructions.

The DAS collects the acquisition data in accordance with the prescription, and provides the acquired data to an image reconstructor for generating a series of images from the acquired data which can be used to produce a volumetric model. A volumetric model typically includes a three dimensional (or higher) rectilinear array of values, often with a single scalar value per sample.

The visualization subsystem controls presentation of all relevant imaging data to the operator. The data includes, for example, 2D images, 3D projections, patient data, annotation, and measurements. Subsystem 52 implements several visualization features such as routine display, cross reference, autoview display, volume autoview display, and other forms of display, using one or more windows or viewports, where each window may include its own set of visualization parameters. As described below in more detail, visualization subsystem includes several components to filter, classify, render, annotate, and take measurements.

The archive subsystem permanently stores (using various media formats) all imaging data, acquired and computed, for future retrieval. This data includes protocols, 2D images, measurements, and 3D renderings as screen captures. 3D protocols, movie clips, and cine loops may also be stored by the archive subsystem.

The filming subsystem generates a hard copy of the imaging data by processing the data to film. This may include 2D images, text and graphic annotations, and 3D renderings of acquired image data. Format and presentation parameters for 3D imaging, e.g., position, orientation, and transparency assignments, may be contained in the exam scan prescription.

The networking subsystem is similar in functionality to the archive subsystem except that the networking subsystem transfers imaging data to or from another imaging system via a networked connection. The networking subsystem can also accept HIS/RIS information and can provide state information for other subsystems. Examples of imaging data include 3D parameters, 3D projections, cine loops, and movie clips may be transferred to a networked workstation via the networking subsystem. The network interface may allow specific studies to be sent to specific network receiver locations.

The networking subsystem may also establish a network connection to an auxiliary processing facility capable of performing view, image, and 3D processing. The auxiliary processing facility could include, for example, dedicated machines which quickly process the received data and return back image data and information. For example, reconstruction codes can be applied to the view data and a reconstructed data set is returned.

The above described imaging system enables an operator to measure and visualize a three dimensional volumetric data set as the data is being acquired. The imaging system also prepares 3D models for post-processing and provides the operator with 3D images and measurements.

DETAILED DESCRIPTION OF THE INVENTION

The present invention is directed, in one aspect, to a volume imaging system. The invention can be practiced in many different medical imaging modalities including computed tomography (CT), magnetic resonance (MR), and ultrasound. Therefore, although the invention is sometimes described herein in the context of a CT imaging system, it should be understood that the invention is not limited to practice in CT and can be used in other modalities as well.

Figure 1:
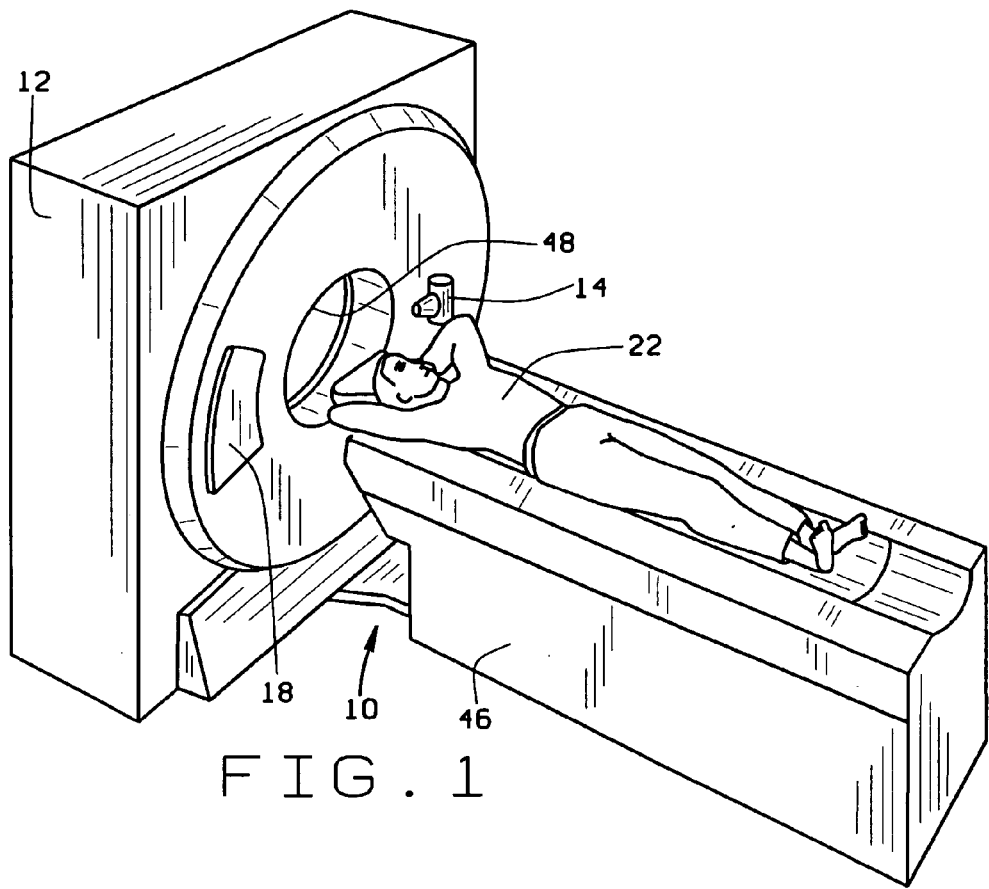
FIG. 1 is a pictorial view of a CT imaging system.
Figure 2:
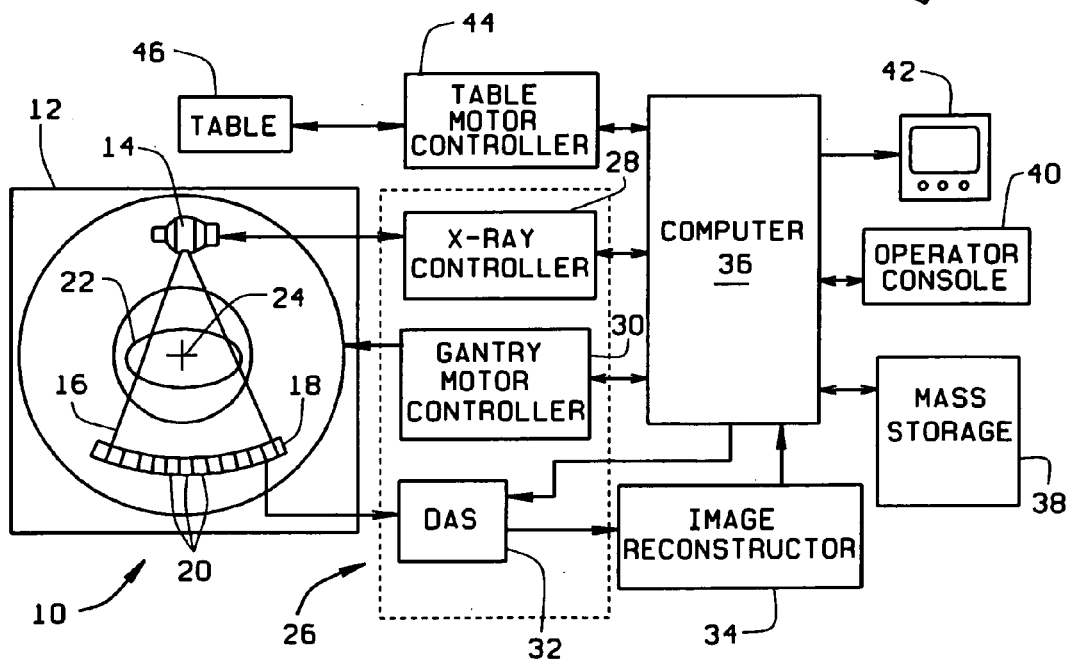
FIG. 2 is a block schematic diagram of the system shown in FIG. 1.

With respect to CT, and referring to FIGS. 1 and 2, a computed tomograph (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through a medical patient 22. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

Figure 3:
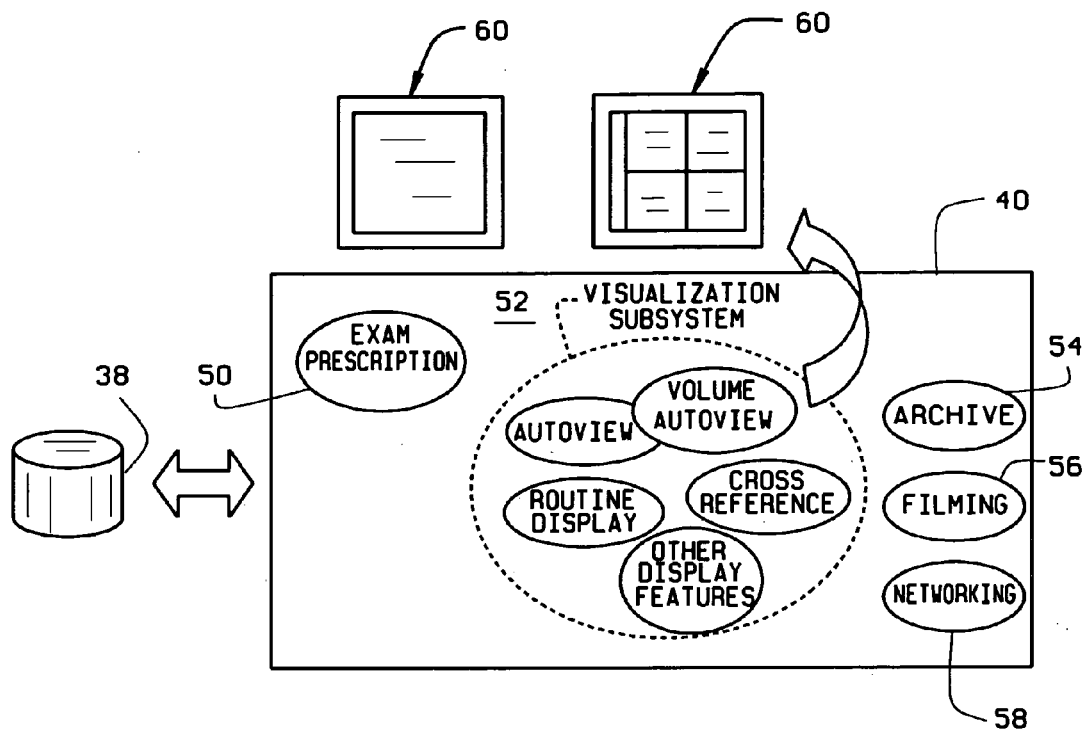
FIG. 3 is a block diagram of an operator console in accordance with one aspect of the present invention.

FIG. 3 is a block diagram of operator console 40. In accordance with one embodiment, computer 36 (FIG. 1) is integrated into console 40, and console 40 includes an exam prescription subsystem 50 which specifics the manner in which the imaging system acquires data, a visualization subsystem 52 responsible for the presentation layout and display of the acquired images and processed data, an archive subsystem 54 for permanent storage and future retrieval of imaging data, a filming subsystem 56 which transfers data onto film, and a networking subsystem 58 that transfers data via a network to or from other imaging systems. Optional remote viewing stations may be coupled to console 40 to enable the remote viewing of images.

Exam prescription subsystem 50 is responsible for determining how the patient exam data is acquired. Numerous parameters are required to specify an acquisition including a sequence of slice locations, slice thickness, field-of-view, scanning technique, and reconstruction algorithm. Volume imaging and filming presentation parameters may also be included in the exam scan prescription. These parameters can be entered explicitly by the technologist or, more commonly, the parameters are defined by selecting a particular scan protocol as is well known in the art. Subsystem 50 generates a scan prescription and the prescription is transmitted to DAS 32 (FIG. 2).

Figure 4:
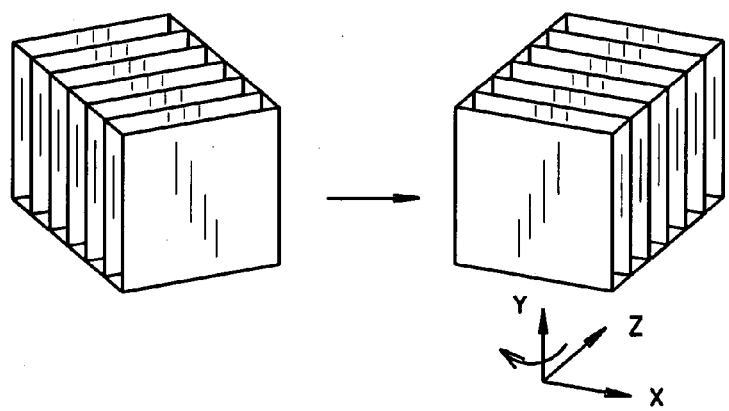
FIG. 4 illustrates rotation of a volume model.

DAS 32 collects the acquisition data in accordance with the prescription, and provides the acquired data to image reconstructor 34 for generating a series of images from the acquired data which can be used to produce a volumetric model. A volumetric model typically includes a three dimensional (or higher) rectilinear array of values, often with a single scalar value per sample. FIG. 4 illustrates a 3D rectilinear model which is constructed from a stack of two-dimensional images. During acquisition, individual slices are acquired and stacked along one dimension of the model. After all slices have been acquired and reconstructed a volumetric model containing $N_x$ by $N_y$ by $N_x$ data samples is produced.

Referring again to FIG. 3, visualization subsystem 52 controls presentation of all relevant imaging data to the operator. The data includes, for example, 2D images, 3D projections, patient data, annotation, and measurements. Subsystem 52 implements several visualization features such as routine display, cross reference, autoview display, volume autoview display, and other forms of display, using one or more windows or viewports 60, where each window 60 may include its own set of visualization parameters. As described below in more detail, visualization subsystem 52 includes several components to filter, classify, render, annotate, and take measurements.

Archive subsystem 54 permanently stores (using various media formats) all imaging data, acquired and computed, for future retrieval. This data includes protocols, 2D images, measurements, and 3D renderings as screen captures. 3D protocols, movie clips, and cine loops may also be stored by subsystem 54.

Filming subsystem 56 generates a hard copy of the imaging data by processing the data to film. This may include 2D images, text and graphic annotations, and 3D renderings of acquired image data. Format and presentation parameters for 3D imaging, e.g., position, orientation, and transparency assignments) may be contained in the exam scan prescription.

Networking subsystem 58 is similar in functionality to archive subsystem 54 except that networking subsystem 58 transfers imaging data to or from another imaging system via a networked connection. Networking subsystem 58 can also accept HIS/RIS information and can provide state information for other subsystems. Examples of imaging data include 3D parameters, 3D projections, cine loops, and movie clips may be transferred to a networked workstation via networking subsystem 58.

Networking subsystem 58 may also establish a network connection to an auxiliary processing facility capable of performing view, image, and 3D processing. The auxiliary processing facility could include, for example, dedicated machines which quickly process the received data and return back image data and information. For example, reconstruction codes can be applied to the view data and a reconstructed data set is returned.

An optional remote viewing station subsystem may also be coupled to console 40. Such a subsystem would add the ability to remotely view real-time display updates of 3D images as the images are generated during acquisition.

Figure 5:
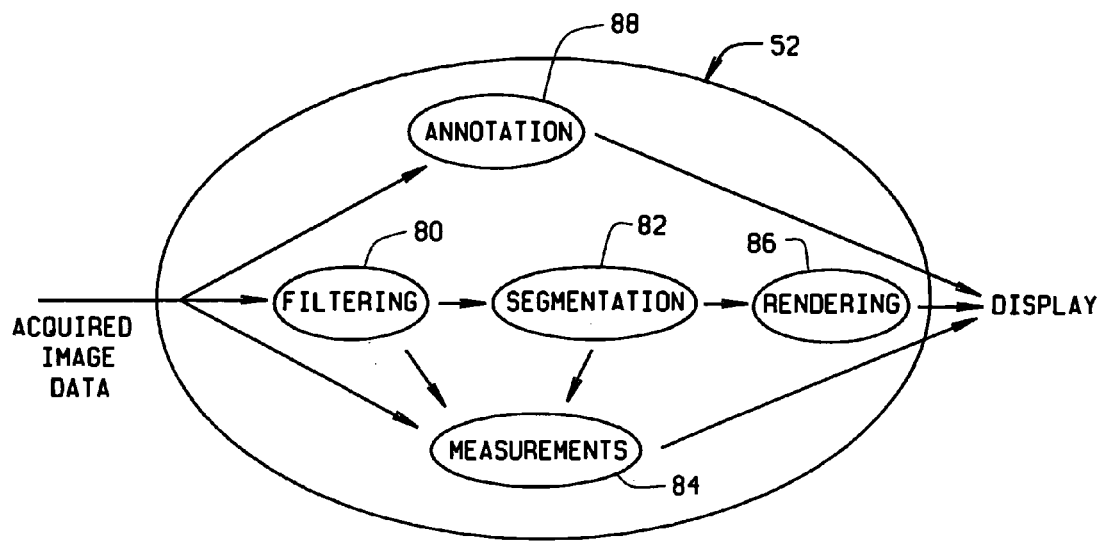
FIG. 5 is a block diagram of a visualization subsystem in accordance with one aspect of the present invention.

FIG. 5 is a block diagram of visualization subsystem 52. A filtering component 80 of subsystem 52 applies image processing filters to the data provided by DAS. Such filtering can include both two- and three-dimensional processing steps and is useful for image enhancement, image restoration or reduction of imaging artifacts, image compression and decompression, and preprocessing required for advanced visualization, as is well known in the art. Importantly, such filtering may occur incrementally during image acquisition. Such filtering can also be performed after the acquisition of a fully acquired data set. When not necessary, filtering component 80 may be bypassed, e.g., to increase processing speed.

Segmentation component 82 classifies the filtered data into separate categories. Component 82 may operate incrementally as the data is acquired, or it may operate after all the data has been acquired. Segmentation may include both two- and three-dimensional processing steps to provide information on how to extract the relevant information from the acquired imaging data. This information may have several forms, including lookup tables on image properties and separate volumes containing binary occupancy or material percentage information.

Measurements component 84 operates on 2D images and 3D volumes in either a realtime or post-acquisition mode. Measurement component 84 may perform calculations on the acquired image data, the filtered data, and/or the segmented data. Measurements include, but are not limited to, distance, surface area, volume, regions of interest (pixel or voxel means and standard deviations), and calcification scoring. As with other visualization components, these calculations may occur incrementally during acquisition or as a post-process.

Rendering component 86 obtains the output directly from image reconstructor 34 (FIG. 2), from filtering component 80, or from segmentation subsystem 82, and computes a new image to be displayed. Rendering component 86 can produce multiple rendered images of the acquired data in either a real-time mode or post-acquisition mode. Both modes support viewing of data as either a 2D cross section or as a higher dimensional projection of the model being acquired.

Annotation component 88 annotates patient and scanning information overlaid on the rendered image. Graphical annotation may also be provided in addition to text for features such as cross reference. Annotation can be applied to 3D renderings as well.

The parameters which govern subsystem 52 can be entered by the user prior to acquisition or included in the scan protocol. The parameters may also be locally adjustable during the acquisition.

Visualization subsystem 52 supports the real-time display of cross sectional data. This visualization feature is commonly referred to as "Autoview". "Volume Autoview", as used herein, refers to an incrementally updated 3D view of the data as the data is being acquired. Volume Autoview attaches to the imaging "stream" from the image reconstructor and is executed at console 40.

During data acquisition, Volume Autoview provides a real-time, incrementally updated, 3D view of the data as the data is acquired over time. This method of rendering is referred to herein as dynamic data rendering (DDR). After the data has been completely acquired, a method of rendering for static data is then utilized. This method of display is referred to herein as static data rendering (SDR). In addition, the capability to render both static data and dynamic data within an integrated view is provided. This type of rendering is referred to as mixed data rendering (MDR). DDR, SDR, and MDR are described below in more detail.

Prior to data acquisition, an exam is prescribed by the technologist. Volume Autoview is integrated with the exam prescription subsystem, providing new parameters which specify how the dynamic volume(s) should be visualized during the acquisition. More particularly, parameters such as position and orientation of the 3D model and view, color and transparency assignments, filter and segmentation settings, visualization technique and algorithm are specified in the protocol. The visualization parameters are also contained in specific VIS scan protocols. Filming can also be prescribed prior to acquisition as well as the generation and archival of movie clips.

As new images are acquired, visualization subsystem 52 filters the images (if necessary) as they are added to the 3D model. Two- and three-dimensional segmentation is also possible for extracting specific information from the images with the constraint that all processing and rendering must "keep pace" with the image generation rates of acquisition subsystem, even with very fast, interventional ("fluoro") scanning modes. Volume Autoview also can be utilized to obtain real time measurements (e.g., volumes of interest, and calcification scoring) on the dynamic volume.

Volume Autoview can be performed in a "rock mode". More specifically, a small rotation angle can be applied to the 3D model, typically about the vertical axis and normal to the viewing vector. The rotation angle varies cyclically as the 3D model is rendered from frame to frame. Such automatic rotation is not only useful in providing another depth cue in the 3D visualization process, but is especially valuable for interventional procedures in which the technologist/radiologist/interventionalist may not have hands free to interact with the 3D model during the acquisition. The rock mode parameters can be included in the prescription, and also can be adjusted by the user.

Volume Autoview also includes intermixing geometry data with volume data. For example, a geometric model of a needle can be embedded into the volume, and Volume Autoview can be utilized to track the position of the actual needle used in a biopsy procedure. Embedded geometry can also be used as three dimensional annotations within the volume.

Multiple imaging windows, or viewports, 60 (FIG. 3) also can be used for independent visualization parameters. For example, during an acquisition, bone structure from a sagital view can be displayed in one window while vasculature from a coronal view can be displayed in a second window. Multiple viewports, each with an independent set of visualization parameters, are provided.

A significant clinical benefit of Volume Autoview may be in the treatment of trauma cases. In such emergency situations, minimizing the total study time is critical. Due to the time constraints, the radiologist may forgo the traditional 3D post acquisition analysis, and rely solely on the information conveyed from the cross sectional data. With Volume Autoview, the radiologist is presented with additional 3D information during the acquisition without a time penalty which may be essential in making the proper diagnosis.

Figure 6:
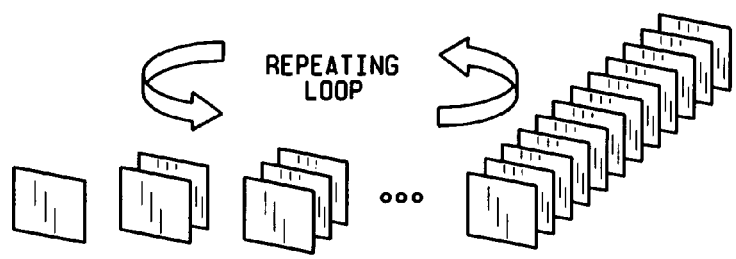
FIG. 6 illustrates replay of an incremental update of an acquired volume of data.

Following acquisition, a review display mode may be utilized to interact with and to further visualize the volume of data, e.g., to extract additional information from the volume. Using a playback feature, renderings of the visualized volume may be output to a VCR. A repeat loop can also be employed, as shown in FIG. 6, which replays the volume as it was being acquired. Multimedia movie clips can also be generated and archived for later replay.

Figure 7:
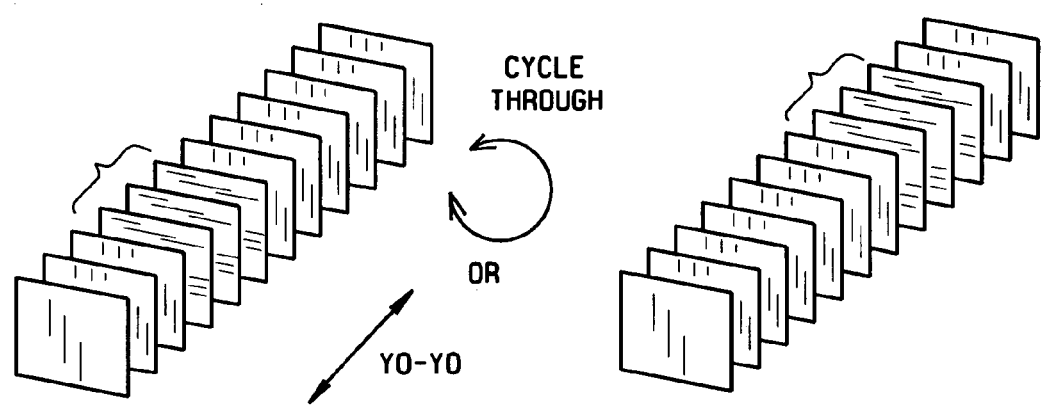
FIG. 7 illustrates playback viewing options.

Referring to FIG. 7, the volume can be cycled through for visualizing a slab, or sub-volume, (e.g., slab cine/paging) of the data at a time. In addition, any 3D renderings can be installed into the image database, archived, filmed, or networked.

Rendering subsystem 86 operates on at least one volumetric model. A virtual camera model is defined to specify the parameters for projecting a volumetric model onto an image plane which is decomposed into $P_x$ by $P_y$ pixels. The camera model utilizes a projection matrix M that defines the mapping from the camera view coordinates to the model data sample coordinates. This matrix accounts for the aspect ratio of the samples in the volume and all transformations (e.g., scaling, translation, and rotation) on the volumetric object and the camera. The matrix M supports common projection techniques including parallel and perspective viewing transformations.

The projection of the volumetric model onto the image plane is accomplished using, for example, ray casting or texture mapping. Of course, other image ordering techniques can be used. The image order technique known as ray casting (RC) casts a ray from each pixel in the image plane into the volume. The volume is then sampled along the ray and data values are combined to form a final pixel for the image. Samples may optionally be mapped to various quantities, such as color or opacity, to support common volume rendering techniques. Common operations applied to samples along the ray are maximum intensity (MIP), average, compositing, and compositing with shading.

Alternatively, a hardware texture mapping (TM) technique may be used. Hardware TM is an object order technique wherein data samples are traversed and blended in the proper order using texture mapped geometric rendering hardware. The samples (or their RGBA mapped values) are mapped onto polygons and the polygons are projected onto the image plane. Depending on the TM hardware, the planes projected may be either axis aligned (2D TM hardware) or oblique and parallel to the camera view plane (3D TM hardware). Similar to RC, the data samples may be converted to other properties, such as color and opacity, to support common volume visualization rendering techniques. All operations on samples available in RC are possible using a TM technique. Both RC and TM techniques, which are well known, may be used to support the three rendering modes described below.

Figure 8:
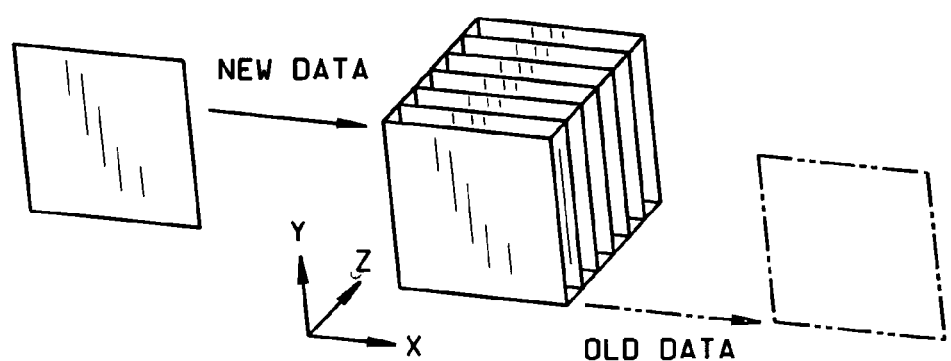
FIG. 8 illustrates rendering of dynamic data.

When the volume model to be rendered changes over time, the rendering process needs to account for these changes in the next rendered image. FIG. 8 illustrates a volume model in which a slice has been replaced with new data. With this type of change, rendering can be performed in two ways. A simple brute-force strategy to rendering is to completely render all the data acquired thus far to produce an up-to date image. However, substantial computational savings can be obtained if the camera and volumetric model remain stationary. In this case, it is possible to incrementally update a previous rendering to account for a change in the volume data.

Figure 9:
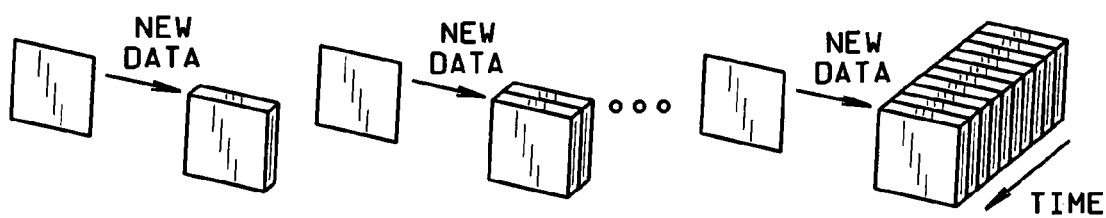
FIG. 9 illustrates incremental update of data.

Using TM, for example, a new rendering is achieved by adding the contribution of each new slice to the previously computed image. FIG. 9 illustrates the volume increasing in size toward the viewer as new slices are added to one end of the volume. When a new slice is available, and using the DDR method, all texture mapped polygons between the last slice and the new one are utilized. The texture mapped polygons containing the colors and opacities of the new slice are transformed through the inverse projection matrix M-1, scan converted, and blended with the current image in the frame buffer. The newly added slice may be added to either the front or the back of the volume with respect to the viewer. Adding the slice in front of the already rendered slices is desirable since it allows the user to view the latest acquired information and, when compositing, it requires no additional memory in the frame buffer for storing partial opacity results. Adding slices behind the previously rendered slices requires the use of front-to-back compositing and therefore requires additional memory per pixel.

If shading is being performed, the computed normals of the previously rendered slice need to be modified. The contribution of the previous slice, however, is already blended in to the current image. Rendering could be delayed by one or more slices so that all information for that slice is available when its contribution is made to the rendered image.

The computational complexity of rendering a volume model with the brute-force incremental approach is O(N), where N is the number of planes in the volume. An incremental approach to rendering reduces the computational complexity of rendering to 0(1), since only 1 additional slice needs to be rendered for each slice added to the volume model.

With incremental rendering, the only change that is supported between renders is the addition of data at the volume model boundary. Also, the orientation of the volume model with respect to the camera image plane must be such that the absolute value of the angle between a slice normal and the image plane normal is within 90 degrees. That is, the camera must be viewing the volume predominantly through the axial slices.

A RC approach to incremental rendering functions in much the same way as the TM approach, but with fewer restrictions. Before any renderings of the volume are made, and for every pixel in the rendered image, ray definitions are stored for every pixel in the volume. When a new slice is added to the volume model, those rays that are immediately affected are determined and, for each one, the contribution of the new slice is calculated. With this approach, there is no restriction on the viewing angle of the volume model. Similar to TM, the computational complexity for adding a new slice to the volume is a constant.

Figure 10:
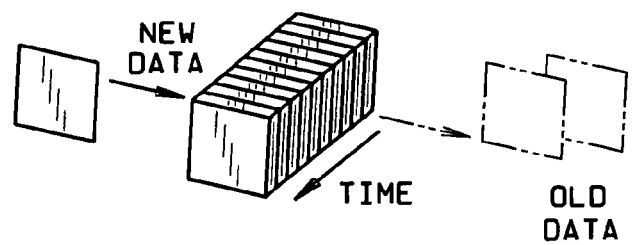
FIG. 10 illustrates a sliding window of dynamic data rendering.

It is often desirable to show the last N slices acquired during scanning. This display type is referred to as a sliding window technique. FIG. 10 illustrates that as scanning progresses, slices are added and removed from the model.

One method for rendering a sliding window model would reconstruct and render an entirely new volume when each new slice is scanned. Similar to incremental rendering, a sliding window rendering technique can take advantage of previous rendering results if the camera view with respect to the volume model is fixed.

Figure 11:
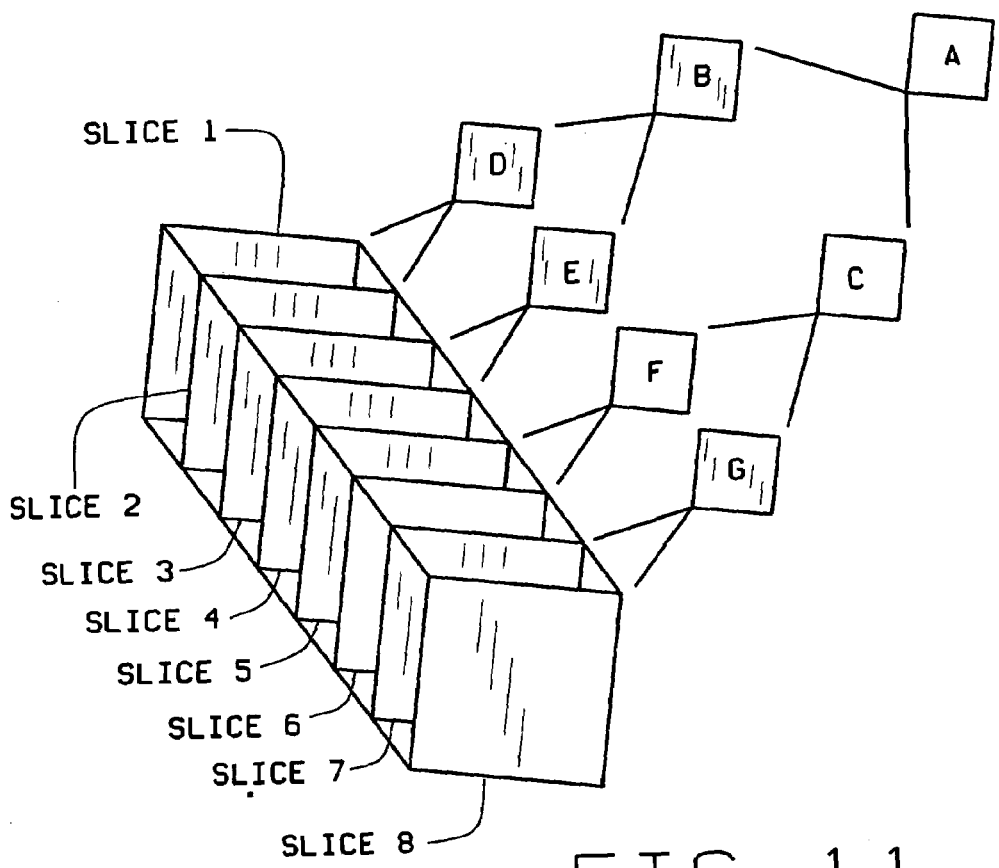
FIG. 11 illustrates a hierarchical data structure.

To efficiently render a volume model after a change has been made to a slice, a hierarchical data structure may be utilized. The hierarchical data structure is in the form of a binary tree, where the leaf nodes are the original slices and the internal nodes are the images produced when rendering pairs of slices. FIG. 11 illustrates a tree produced from the 8 original slices. Node F contains the image produced (typically the color (R,G,B) and opacity (A) for each pixel) when just slices 5 and 6 are projected onto the camera view plane. Node C contains the image produced when nodes F and G are projected and therefore also represent the projection of slices 5 to 8. Nodes A–G store an image of the partial results of rendering the entire volume model. These projected images are the same size as the camera view plane size, which is $P_x$ by $P_y$ pixels.

When a change is made to a slice, such rendering recombines all nodes that could be affected by that change. As shown in FIG. 11, slice 6 has changed and therefore the images at nodes F, C, and A need to be recomputed. This technique effectively reduces the computational complexity of rendering a single slice change to a volume from O(N) to O(log(N)), where N is the number of slices in the volume model.

Alternatively, each leaf of the tree may represent a plane of samples which are not necessarily located on an original slice. A form of interpolation, such as trilinear interpolation, can be used to compute the sample values. If a single original slice of a volume model is modified it will have an effect on any samples that take place within the 1 slice region around it. In this case, multiple leaves of the tree will change and there is a possibility that more nodes will need to be processed to compute a new image.

FIG. 11 illustrates a case in which the slice being changed is inside the previously rendered model. If the slice is being added or removed from the model, the hierarchical data structure will need to change to account for the addition. If slice 9 is added to the volume model, a new node H will be inserted into the tree at the same level as G. Supporting nodes will also be built and the resulting tree will be temporarily unbalanced.

The sliding window rendering method can also be realized with RC. Each ray cast builds a hierarchical data structure storing partial results for pairs of samples along the ray. If a change occurs along the ray, the partial results can be efficiently recombined to build a new rendering.

The hierarchical rendering described above is applicable to a wide range of scanning methods. The method supports efficient rendering of any change within a volumetric model. For instance, when scanning freehand with an ultrasound probe, any plane cutting through the model can be acquired and updated. This hierarchical rendering method supports the efficient rendering of these arbitrary updates.

As data is being acquired, all information necessary for post-processing visualization is incrementally computed. When the scanning system has acquired a full volume, the model may then be visualized using standard volume visualization techniques, such as TM or RC. The operator may immediately review the scanned data in a three dimensional display.

A volume model often contains more than just a collection of slices. Gradient information at each location is typically computed in addition to segmentation volumes. It is advantageous to precompute this information since calculating it during rendering is extremely time consuming and computationally expensive. The construction of these additional data structures can be performed incrementally during scanning if sufficient computing resources are available.

Figure 12:
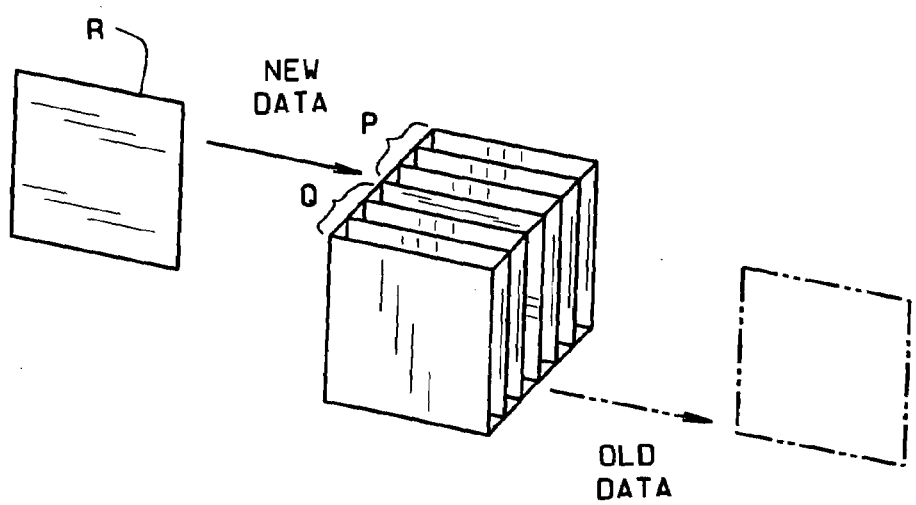
FIG. 12 illustrates mixed data rendering.

Mixed data rendering (MDR) combines both a static, previously acquired, volume model with dynamic data. FIG. 12 illustrates a volume model in which all slices are static except for one. The dynamic slice is continuously changing as the scanner acquires new information on that plane. Rendering this type of mixed data can be achieved with either a brute-force, i.e., render the entire volume each time, approach or with fixed view rendering variants. For the situation illustrated in FIG. 12, an image P of all slices projected before the dynamic slice, as well as an image Q of all slices projected after the dynamic slice, can be stored. When a new dynamic slice R is acquired, rendering simplifies to combining image P, then the projection of the dynamic slice, and finally the image Q.

MDR is potentially useful in a CT fluoroscopy setting, for example, where a previously acquired scan can indicate the presence of important anatomy in front of and behind the acquisition area. This capability can, for instance, present an interventional radiologist with visual information on the 3D location and structure of nearby ribs as a needle biopsy is performed.

The above described volume imaging system progressively constructs, analyzes, and updates three dimensional models while cross-sectional data (not limited to but including axial cross-sectional data) is being acquired. The system constructs and displays three-dimensional renderings, and performs quantitative calculations in real time during the imaging system data collection process, displays interactive three-dimensional renderings in a traditional post-data collection process, as well as prescribes, archives, films, and transmits rendering procedures, parameters, renderings, measurements, and processed data, during data collection and post-acquisition.

The above described rendering techniques are applicable to any type of scanning modes, including single slice scanning and volumetric scanning modes. For volumetric scanning, the acquired imaging data stream simply includes a collection of 3D images.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An imaging system comprising:
   an exam prescription subsystem which specifies the manner in which data is to be acquired; and
   a visualization subsystem responsible for controlling display of acquired images and data, said visualization subsystem is configured to operate in a volume autoview mode so that during data acquisition, a real-time, incrementally updated, three-dimensional view of the data is displayed, wherein said volume autoview mode can be performed in a rock mode wherein a rotation angle is applied to a 3D model, said rotation angle varying back and forth cyclically as the 3D model is rendered from frame to frame.

2. An imaging system in accordance with claim 1 further comprising a data acquisition system for acquiring scan data, and an operator console comprising said exam prescription subsystem and said visualization subsystem.

3. An imaging system in accordance with claim 1 further comprising an archive subsystem for storage of imaging data.

4. An imaging system in accordance with claim 1 further comprising a filming subsystem for transferring data onto film.

5. An imaging system in accordance with claim 1 further comprising a networking subsystem that transfers data via a network to external devices.

6. An imaging system in accordance with claim 1 wherein said exam prescription subsystem acquires parameter data comprising at least one of a sequence of slice locations, slice thickness, field-of-view, scanning technique, and reconstruction algorithm.

7. An imaging system in accordance with claim 6 wherein said parameter is contained in a scan protocol.

8. An imaging system in accordance with claim 1 wherein said visualization subsystem comprises a rendering component configured to receive data from at least one of a data acquisition system, a filtering component of said visualization subsystem, and a segmentation subsystem of said visualization subsystem, said rendering component configured to generate multiple images based on the acquired data in at least one of a real-time mode and a post-acquisition mode.

9. An imaging system in accordance with claim 1 wherein said visualization subsystem is further configured to operate in a static data rendering mode and a mixed data rendering mode.

10. An imaging system in accordance with claim 1 wherein said visualization subsystem is configured to operate in a review display mode, said review display mode comprising at least one of a playback mode and a repeat loop mode.

11. An imaging system in accordance with claim 1 wherein said visualization subsystem generates at least one volumetric model, and wherein projection of said volumetric model onto an image plane is accomplished using at least one of ray casting and texture mapping.

12. An imaging system in accordance with claim 11 wherein said volumetric model is incrementally rendered.

13. An imaging system in accordance with claim 11 wherein said volumetric model is rendered using a sliding window.

14. An imaging system in accordance with claim 11 wherein said volumetric model is defined in a hierarchical data structure.

15. An imaging system in accordance with claim 1 wherein said rendering subsystem is operable in at least one of a single slice mode and a multiple slice mode.

16. An imaging system in accordance with claim 1 wherein said system utilizes at least one of computed tomography, magnetic resonance, and ultrasound acquired data to generate an image.

17. A visualization subsystem for a medical imaging system, the medical imaging system including a data acquisition system for acquiring scan data, said visualization subsystem comprising a processor programmed to render an image from data received from at least one of the data acquisition system, a filtering component of said visualization subsystem, and a segmentation subsystem of said visualization subsystem, wherein said processor is further programmed to classify data into separate categories, and wherein said processor is further programmed to operate in a volume autoview mode so that during data acquisition, a real-time, incrementally updated, three-dimensional view of the data is displayed, and further wherein said volume autoview mode can be performed in a rock mode wherein a rotation angle is applied to a 3D model, said rotation angle varying back and forth cyclically as the 3D model is rendered from frame to frame.

18. A visualization subsystem in accordance with claim 17 wherein to render an image, said processor is programmed to generate multiple images based on the acquired data in at least one of a real-time mode and a post-acquisition mode.

19. A visualization subsystem in accordance with claim 17 wherein said processor is further programmed to apply image processing filters to the data received from the data acquisition system.

20. A visualization subsystem in accordance with claim 17 wherein said processor is further programmed to perform measurements on the data, said measurements comprising at least one of distance, surface area, volume, regions of interest, and calcification scoring.

21. A visualization subsystem in accordance with claim 17 wherein the image is rendered in at least one of a real-time mode and a post-acquisition mode.

22. A visualization subsystem in accordance with claim 17 wherein said processor is further programmed to annotate patient and scanning information.

23. A visualization subsystem in accordance with claim 17 wherein said processor is further programmed to operate in a static data rendering mode and a mixed data rendering mode.

24. A visualization subsystem in accordance with claim 17 wherein said visualization subsystem is configured to operate in a review display mode, said review display mode comprising at least one of a playback mode and a repeat loop mode.

25. A visualization subsystem in accordance with claim 17 wherein said processor generates at least one volumetric model, and wherein projection of said volumetric model onto an image plane is accomplished using at least one of ray casting and texture mapping.

26. A visualization subsystem in accordance with claim 26 wherein said volumetric model is incrementally rendered.

27. A visualization subsystem in accordance with claim 26 wherein said volumetric model is rendered using a sliding window.

28. A visualization subsystem in accordance with claim 26 wherein said volumetric model is defined in a hierarchical data structure.

29. A visualization subsystem in accordance with claim 17 wherein the scan data at least one of computed tomography, magnetic resonance, and ultrasound acquired data.

30. A method for operating a medical imaging system to generate three dimensional models while the system acquires cross-sectional data, said method comprising the steps of:
  acquiring a first slice of data;
  generating a three dimensional model based on the first slice of data, said generating including incrementally updating a three-dimensional view of the data; and
  applying a rotation angle to the model, the rotation angle rocking by varying back and forth cyclically as the model is rendered from frame to frame.

31. A method in accordance with claim 31 wherein generating a three dimensional model comprises the step of filtering the data.

32. A method in accordance with claim 31 wherein generating a three dimensional model comprises the step of classifying the data into separate categories.

33. A method in accordance with claim 31 further comprising the step of performing measurements on the data, the measurements comprising at least one of distance, surface area, volume, regions of interest, and calcification scoring.

34. A method in accordance with claim 31 wherein generating a three dimensional model comprises the step of annotating patient and scanning information.

35. A method in accordance with claim 31 wherein generating a
  three dimensional mode comprising the step of projecting the model onto an image plane using at least one of ray casting and texture mapping.

* * * * *